Oct. 12, 1954   J. J. BAUMAN ET AL   2,691,552
HANDLE ASSEMBLY
Filed Sept. 3, 1949
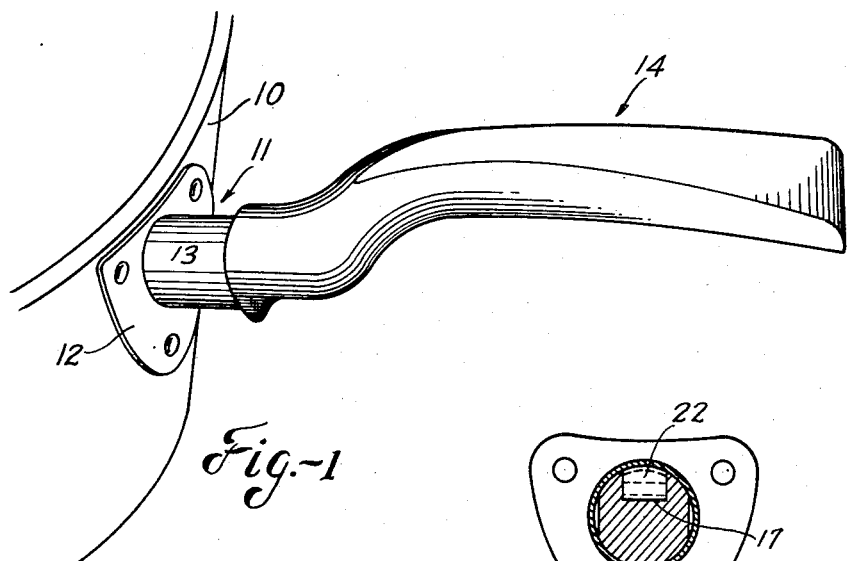
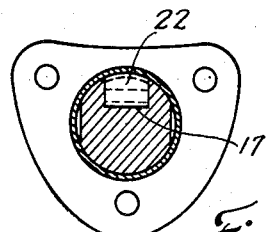
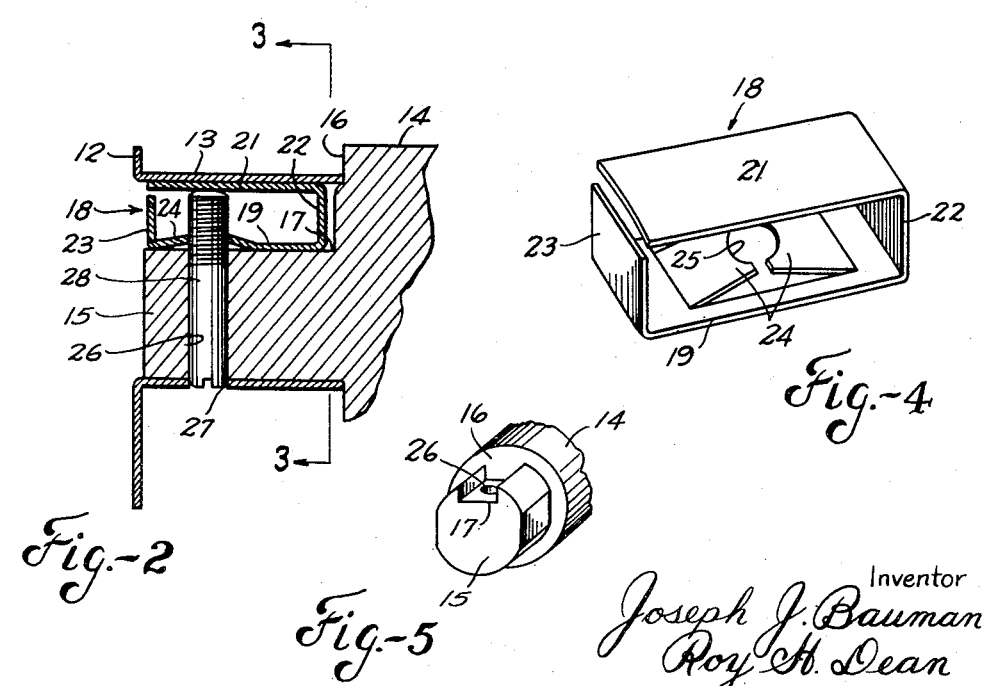
Inventor
Joseph J. Bauman
Roy H. Dean
Tom Walker
Attorney Patented Oct. 12, 1954

2,691,552

UNITED STATES PATENT OFFICE 2,691,552

HANDLE ASSEMBLY

Joseph J. Bauman, Chicago, Ill., and Roy H. Dean, Dayton, Ohio, assignors to Kurz-Kasch, Inc., Dayton, Ohio, a corporation of Ohio Application September 3, 1949, Serial No. 114,012

4 Claims. (Cl. 306—29)

1

This invention relates to handle assemblies, and more particularly to handle mounts for cooking vessels and like utensils.

In specific aspects thereof, the instant invention represents a further improvement and development of the invention disclosed in the co-pending application of Joseph J. Bauman, Serial No. 652,376, filed March 6, 1948, for Utensil Handle, now abandoned. As such, this invention contemplates an improved attachment means for use in a handle mount wherein the handle is received in a ferrule, secured to the utensil, and frictionally held in engagement therewith.

The object of the invention is to simplfy the construction as well as the means and mode of assembling utensil handles, whereby such handles may not only be economically manufactured, but will be more efficient and satisfactory in use, adaptable to a wide range of utensils, having relatively few parts and be unlikely to get out of repair.

A further object of the invention is to obtain a broader and more effective frictional engagement between the handle and ferrule.

A further object is to distribute applied frictional pressures over a larger area to avoid deforming of the ferrule.

A further object of the invention is to provide a greater resistance to loosening of the connection.

A further object of the invention is to provide a handle assembly possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawing, wherein is found the preferred but obviously not necessarily the only form of embodiment of the invention, Fig. 1 is a fragmentary view, in perspective, of a cooking utensil, showing the handle mounting of the present invention;

Fig. 2 is a view, in longitudinal section, of the ferrule, showing the handle engaged therein;

Fig. 3 is an end view partly in section of the handle assembly; and

Fig. 4 is a view, in persepective of a friction nut comprised in the handle assembly.

2

Fig. 5 is a fragmentary perspective view of the end of the handle.

Like parts are indicated by similar characters of reference throughout the several views.

Referring to the drawings, the invention is disclosed as embodied in a cooking utensil handle. As shown in Fig. 1, a utensil 10 has a metal ferrule 11 riveted or otherwise secured to the side thereof. The ferrule 11 comprises a flange 12 in surface contact with the utensil and an outwardly projecting cylindrical sleeve 13 integrally drawn or extruded, and relatively thin. The sleeve 13 receives one end of a suitably formed handle 14 made of non-metallic material, for example molded plastic.

Referring to Fig. 2, the end of the handle 14 cooperable with the ferrule 11 comprises a portion 15 of reduced diameter having a close fit in the sleeve 13 which abuts a shoulder 16 on the handle defined by projecting portion 15. Formed in the periphery of end portion 15 is a longitudinal slot or recess 17 opening through the outer end of such portion and extending approximately the full length thereof. Seated in the slot 17 is a friction nut 18 corresponding in width to that of the slot and approximately in length to that of the slot.

The nut 18 comprises a base member 19 resting on the bottom of the slot 17, an arm 21 in overlying vertically spaced relation to the base member, and two upstanding end walls 22 and 23, the former of which integrally unites the base 19 and arm 21 and the latter of which is integrally formed with the base 19 but unconnected to the arm 21.

The nut 18 is made of spring steel or the like and the base member 19 and arm 21 are capable of limited flexure about the end wall 22. End wall 23 underlies the free end of arm 21 and limits motion thereof toward the base member. A slight initial tension of arm 21 in an outward direction tends to place it in surface contact with the internal wall of sleeve 13, and the arm is transversely curved, as seen in Fig. 3, to conform to the curvature of the sleeve.

There is struck up from the base member 19 of nut 18 screw engaging walls 24 defining an opening 25. In the installed position of the nut, the opening 25 overlies and registers with a transverse bore 26 in end portion 15. The bore 26 is smooth walled and opens at one end into the slot 17 and at its other end into the periphery of end portion 15 on the side opposite slot 17. Installed in the bore 26, through a registering opening 27 in the sleeve 13, is a screw stud 28. The inner end of stud 28 projects into slot 17, passing through opening 25 in threaded connection with walls 24 and abutting the underside of arm 21. In turning the screw stud into position in the assembly, it engages and presses arm 21 into tight frictional contact with sleeve 13 on one side thereof.

At the same time, a force of reaction is generated by reason of the threaded connection of the stud with base member 19 tending to press the end portion 15 into tight frictional contact with sleeve 13 on the opposite side thereof. By reason of the construction and arrangement of the nut 18 the thrust pressures set up by the screw stud 28 are applied over relatively broad and long areas of the sleeve 13. A connection of considerable tenacity is so obtained between the handle and the ferrule and any localized deforming of the relatively thin sleeve 13 avoided.

In assembling the parts, the handle 14 may be inserted in the sleeve 13 with the nut 18 mounted in slot 17. Entry of handle portion 15 into sleeve 13 serves to compress the nut 18 somewhat so that an expansive force is produced tending to hold the handle and ferrule in a set position of adjustment. Screw stud 28 then is inserted into bore 26 through sleeve opening 27 and is rotated as it enters screw opening 25 in base member 19. Continued rotation of the stud causes the end thereof to engage arm 21 and further rotation sets up the aforementioned forces of action and reaction producing frictional engagement of the handle with the ferrule.

As shown in Fig. 2, in the installed position of the screw stud 28 the lower end thereof lies within opening 27 substantially flush with the outer surface of sleeve 13. Accidental detachment of the handle from the ferrule, as might result from loosening of the screw stud, thereby is avoided. It will be recognized, however, that the nut 18 is of the self-locking type, the tension applied to the struck up walls 24 being such as to resist the ordinary causes of loosening of the screw stud.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. A handle assembly, including a ferrule presenting a cylindrical sleeve, a handle presenting an end portion received in said cylindrical sleeve, a peripheral recess in said end portion surrounded by said sleeve, a nut mounted in said recess and including underlying and overlying flexible portions capable of movement relative to one another, said underlying portion resting on the bottom of said recess and said overlying portion engaging the internal surface of said sleeve, and a screw stud passed transversely through said end portion and into said recess, said stud being in screw threaded connection with the underlying portion of said nut and in abutting relation with said overlying portion, said screw stud being accessible from outside the ferrule for advancement into said recess to separate the underlying and overlying portions of said nut and thereby effect a frictional engagement of said handle in said ferrule.

2. A handle assembly, including a ferrule presenting a cylindrical sleeve, a handle presenting an end portion received in said sleeve, a rectangular recess formed in the periphery of said end portion and of a length approaching the length of said end portion, a friction nut seated in said recess and comprising spaced apart flexible arms in contact respectively with the bottom of the recess and with the overlying surface of said sleeve, and means applying a separating tension to said arms to frictionally hold said handle in said ferrule.

3. A utensil handle assembly, including a metal ferrule presenting a relatively thin cylindrical sleeve, a non-metallic handle presenting an end portion received in said cylindrical sleeve, a longitudinal elongated slot in the periphery of said end portion, a friction nut seated in said slot and comprising a base member resting on the bottom of said slot, an arm in overlying spaced relation to said base member, an end wall interconnecting said base member and said arm and permitting relative flexure therebetween, and a screw engaging portion struck upward from said base member, a transverse bore in said end portion opening into said slot and registering with the screw engaging portion of said nut, a screw stud installed in said bore in threaded engagement with the screw engaging portion of said nut and abutting engagement with the overlying arm of said nut, rotation of said screw stud into said slot serving to spread apart the base member and overlying arm of said nut for the application of frictional retaining pressure against the internal wall of said sleeve, and an opening in said sleeve for insertion and removal of said screw stud.

4. A handle assembly, including a ferrule presenting a cylindrical sleeve, a handle presenting an end portion received in said sleeve, a longitudinal recess formed in the periphery of said end portion over substantially the full length thereof, a friction nut seated in said recess and comprising spaced apart flexible arms in contact respectively with the bottom of the recess and with the aligned portion of the internal wall of said sleeve, a screw engaging opening in one of said arms, a screw stud in screw threaded engagement with said opening and simultaneously abutting the other said arm, and a radial opening in said sleeve aligned with said recess providing access to said screw stud for adjustment thereof to apply a separating tension to said arms to frictionally hold said handle in said ferrule.

References Cited in the file of this patent

UNITED STATES PATENTS

| Number | Name | Date |
|---|---|---|
| 2,133,252 | Moore et al. | Oct. 11, 1938 |
| 2,378,684 | Carlstrom | June 19, 1945 |
| 2,417,117 | Marcus | Mar. 11, 1947 |
| 2,427,369 | Ruple | Sept. 16, 1947 |
| 2,578,008 | Judd | Dec. 11, 1951 |

FOREIGN PATENTS

| Number | Country | Date |
|---|---|---|
| 459,876 | France | Sept. 18, 1913 |
| 534,563 | Great Britain | Mar. 10, 1941 |